Dec. 8, 1970     H. GREMERET     3,545,822
DRIVE APPARATUS WITH A FLEXIBLE, ENDLESS BAND
Filed May 10, 1968     2 Sheets-Sheet 1
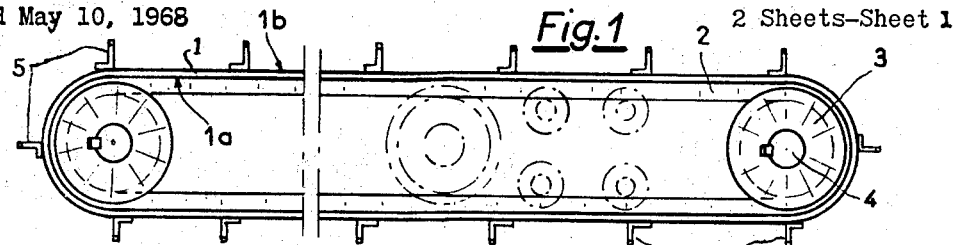
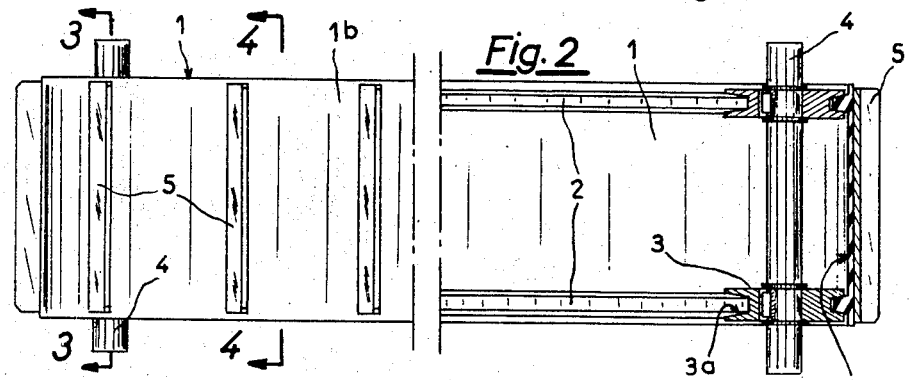
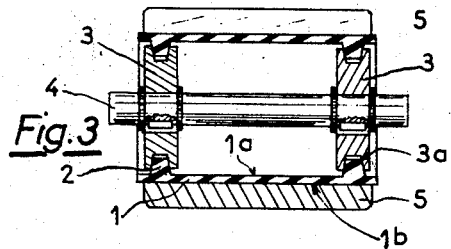
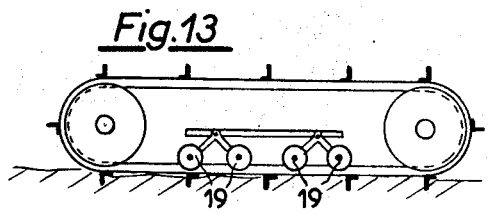
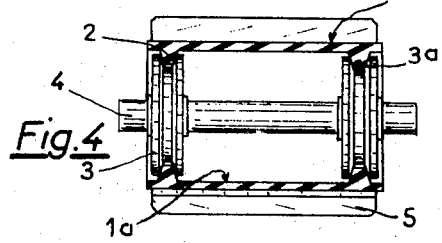
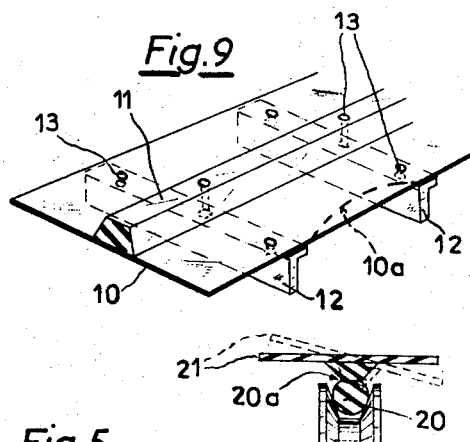
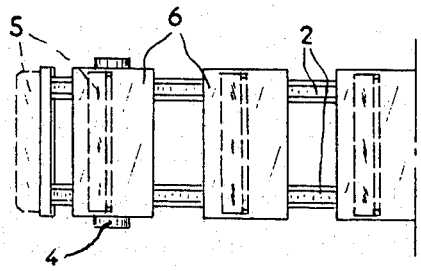
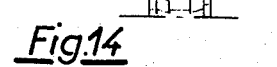

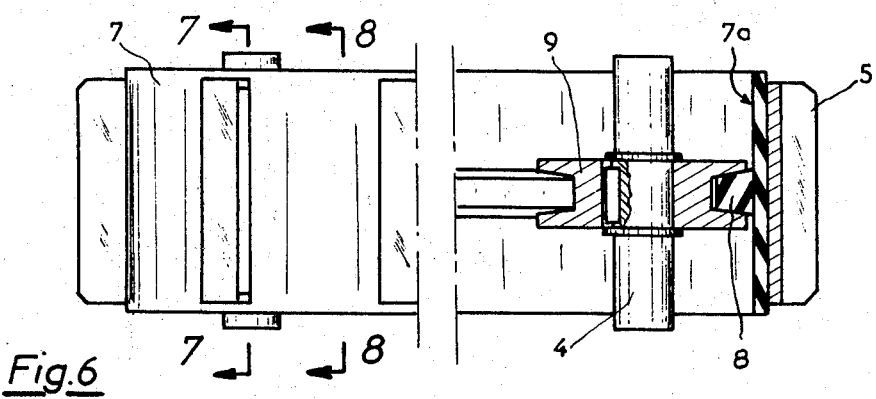

United States Patent Office 3,545,822
Patented Dec. 8, 1970

3,545,822
DRIVE APPARATUS WITH A FLEXIBLE, ENDLESS BAND
Henri Gremeret, 1 Avenue de Verdun,
Mento, Alpes-Maritimes, France
Filed May 10, 1968, Ser. No. 728,202
Claims priority, application France, Apr. 11, 1968, 68/91
Int. Cl. B62d 55/24
U.S. Cl. 305—38                                      6 Claims

ABSTRACT OF THE DISCLOSURE

An endless flexible band having at least one longitudinal strip on the inner surface of the band adapted to engage in corresponding grooves in a drive and reversing pulley whereby the band is driven and simultaneously transversely guided.

BRIEF SUMMARY OF THE INVENTION

The invention relates to drive apparatus having a flexible, endless drive belt or band. Apparatus of this type may be used in a great many ways, notably in the form of a tracklayer or crawler band for moving vehicles, and also on stationary installations having conveying or driving surfaces.

An object of the invention is to provide apparatus which is more efficient, lighter, simpler and more economical, in numerous applications, than are the drive systems hitherto known and employed.

The apparatus according to the invention comprise, according to a first feature, a flexible, endless belt or band, having at least one longitudinal strip on its inner face integral therewith or secured thereto, each strip cooperatively engaging wheels or pulleys of corresponding drive means, in such manner that the driving and transverse guiding of the band are simultaneously effected.

According to a further feature, the flexible, endless band is integrally formed on its inner surface with a multiplicity of strips, each engaged in the grooves of an associated pair of pulleys.

According to a further feature of the invention only one strip is employed and is disposed along the median longitudinal axis of the band.

According to a further feature of the invention, the flexible, endless band has external means thereon improving adhesion with the surfaces which are intended to be engaged thereby.

According to yet a further feature, each longitudinal strip is of trapezoidal section, the pulleys being formed with correspondingly profiled grooves.

These features and still further features will become evidently clear from the following descriptions given with reference to specific embodiments.

BRIEF DESCRIPTION OF THE DRAWINGS

FIG. 1 is a side view of a first embodiment of a driving band device according to the invention broken in length;

FIG. 2 is a plan view of the device of FIG. 1 partially in section;

FIGS. 3 and 4 are cross-sections taken along lines 3—3 and 4—4 respectively in FIG. 2;

FIG. 5 is a plan view of a modified embodiment of the drive band;

FIG. 6 is a plan view partially in section of a further embodiment of the driving band device;

FIGS. 7 and 8 are cross-sections along lines 7—7 and 8—8 respectively in FIG. 6;

FIGS. 9, 10 and 11 are perspective views partly in section of further embodiments of the driving band according to the invention;

FIG. 12 is a perspective view of an embodiment of an inner reinforcing framework for a driving band; the broken lines represent the endless, flexible band;

FIG. 13 is a side view on a reduced scale of a driving band in the form of a tracklayer band equipped with intermediate support rollers; and FIG. 14 is a sectional view of a modified form of the belt.

DETAILED DESCRIPTION

The invention will next be described in greater detail with reference to the specific illustrated embodiments which are intended merely to depict non-limitative examples.

FIGS. 1 and 4 show an embodiment of the driving device comprising a flexible, endless band 1 manufactured from any desired material having properties which are suitable for the applications involved.

The band 1 may be made from natural or synthetic rubber, from plastic material, from a woven fabric or plasticized cloth, or from any other material having properties corresponding to the purpose and applications for which it is required, i.e. flexibility, dimensional stability, resistance to external agents, etc.

On its inner face 1a, the endless, flexible band has parallel strips 2 which are fixed to said band by rivets, by an adhesive, or by other suitable means.

The strips 2 are also made from a flexible material. They may be manufactured from a material which is identical to that of the band 1.

According to the invention, the band 1 may be integrally moulded in one piece with the strips 2.

The band and the strip, manufactured separately or in one piece, may advantageously be reinforced (depending on the applications intended) so as to substantially increase their resistance to stretching and rupture forces. For this purpose, flexible metal wires, plastic filaments, braids, fabrics, etc. may be embedded in the moulded material constituting the bands and strips.

The strips 2 are preferably of trapezoidal section, so as to insure satisfactory adhesion within corresponding grooves 3a of wheels or pulleys 3. Instead of the use of two wheels 3 on the same shaft, as in FIGS. 1–4, the wheels may be replaced by a single roller formed with trapezoidal-section grooves (or grooves having some other sectional shape) corresponding to that of the strips.

In order to improve adhesion and to prevent any possibility of slipping, projections and complementary recesses are formed in the grooves 3a and in the sides of the strips 2, thus insuring closer cooperation.

One or more shafts 4 for the wheels 3 may be driven in any known manner to drive the band 1.

In particular, when the band device is utilized as a tracklayer band for bearing on the ground, on snow or on loose soil, for the travel of a movable vehicle, the band 1 will be provided on its outer face 1b with means which improve adhesion and permit engagement. Referring to FIGS. 1–4, such means is constituted by L-profile bars 5 secured transversely on the band 1 at regular intervals, the bars being optionally made from high-strength steel. In place of bars, it is possible to use nails having projecting heads. The outer face of band 1 may also be provided (directly by moulding) with roughened portions of appropriate shape and dimensions.

In the embodiment shown in FIG. 5, the endless band is discontinuous and is constituted by plates 6 secured at uniform intervals on the strips 2. The plates 6 provide a satisfactory engagement. It is, however, also possible to equip them with crossbars (shown in broken lines).

Although what has been shown in the figures is a two strip device having corresponding wheels or pulleys, it should be emphasized that the device may be designed to have more than two strips and a corresponding number of wheels or pulleys. The number of wheels and pulleys and the space which separates them are appropriately determined depending on the applications and their technical features.

Similarly, one or more intermediate wheels or pulleys may be mounted as shown by broken lines in FIG. 1.

In the embodiment illustrated in FIGS. 6-8, the flexible, endless band 7 has, on its inner face 7a a single strip 8 extending along the median axis of the said face and secured to the band as a separate member or integrally therewith.

The strip 8 cooperatively engages wheels or pulleys 9 under the conditions already described.

In this case, and as illustrated by the broken lines shown in FIGS. 7 and 8, transverse deformations (which may or may not involve a torsion effect on the strip), enable the band 7 to more closely conform with the raised portions of the ground or of surfaces on which it bears. Emphasis is to be given to the torsion effect of the belt 8 which, despite transverse guiding and driving, permits excellent adaptation of the band to the shapes and profiles of the most varied bearing surfaces. The efficiency of the tracklayer band is substantially improved with this arrangement.

FIG. 9 shows an embodiment of the endless driving band involving the assembly of three separate elements, i.e. band 10, trapezoidal-section strip 11, L-shaped transverse bars or cleats 12. The assembly is made with the aid of rivets 13.

According to a feature of the invention, the band 10 is constituted of a thin and extremely flexible sheet. It may, for example, be a sheet constituted of a polyamide filament fabric, the said fabric being plasticized.

In this case, the band assembly exhibits the following qualities: lightness simultaneously with high strength; deformability; and greatly reduced inertia.

The band 10 is capable of undergoing a dished deformation between the bars 12 and the strip 11, as illustrated by broken lines 10a in FIG. 9. Contact is improved as is also the grip of the device utilized, notably, a tracklayer band on snow, loose soil, etc.

In the embodiment of the flexible, endless driving band 14 illustrated in FIG. 10, the band 14a, the trapezoidal strip 14b and the transverse ribs 14c, form a single element 14, moulded as a unitary body. The ribs 14c extend transversely at regular spaced intervals and have sectional shapes and dimensions (related to the appropriate spacing) which may vary depending on the applications concerned.

The embodiment shown in FIG. 11 involves a flexible, endless driving band 15 of unitary type, and the elements of which are moulded in one piece. In this case, regularly arranged portions 15a on the outer face of the band are continuously placed. The profile of the portions 15a is intended merely as exemplary.

In these embodiments, only the strip (or the bars) could be integral with the band, the other element being attached.

An inner band-reinforcing framework is illustrated in FIG. 12. The reinforcing framework comprises transverse rods 16 which may be rigid or semi-rigid, and wires or connecting means 17 of a more flexible constitution. The rods 16 and the wires 17 are embedded in the band 18 (shown in broken lines) during the moulding of the said band. Rods 16a may be embedded in the bars 14c in FIG. 10 or the portions 15a in FIG. 11. The rods 16 and wires 17 are made of metal or of a plastic material having suitable properties, giving due consideration to the necessary rigidity, semi-rigidity or flexibility.

Preferably, the cross rods 16 and longitudinal wires 17 are perpendicular and are interconnected in any known manner, such as by means of shackles, joints, adhesives, etc. The rods and wires may also be moulded in one piece.

In this manner, the flexible, endless band has the necessary longitudinal flexibility and furthermore, transversely, the said band has greater firmness and rigidity, without excluding the capacity for a certain degree of resilient deformation in order to improve bearing on the ground or on snow.

This reinforcing framework opposes permanent transverse deformation of the band. Abnormal stressing of the strip or strips and of the band is avoided.

FIG. 13 shows diagrammatically a device having an endless, flexible driving band, comprising intermediate rollers 19 for the supporting of the band and of the strip. The rollers 19 are mounted in articulated manner (which may be resilient) in such manner as to be displaced in accordance with the variations of the profiles.

A modification is illustrated in FIG. 14, which shows a strip 20 of substantially circular section with recesses at 20a for permitting pivoting movement of the band. The side surfaces of the grooves in the wheels are flat whereby transverse pivoting movement of the band 21 (shown in broken lines) is achieved while at the same time adaptation of the strip 20 to the bearing surfaces is achieved.

In the above description there has been demonstrated the usefulness and efficiency of arrangements which provide simultaneously, in a rational and reliable manner, driving and transverse guiding of an endless, flexible band. The driving or longitudinal traction force is transmitted to the band by at least one strip which constitutes a resistant and reinforced part of the band. The band may be constituted by a simple sheet of highly flexible material which is also thin and strong. The device may be used as a tracklayer band serving for the driving of moving machines, in particular machines intended for travel on snow or loose soil or diminished supporting capacity, or in numerous applications of fixed installations of all kinds, for example, in conveyor surfaces.

Numerous variations and modifications of the disclosed invention will now become apparent to those skilled in the art without departing from the scope and spirit of the invention.

What is claimed is:

1. Drive apparatus comprising an endless flexible sheet having inner and outer surfaces, at least one continuous longitudinal strip on the inner surface of said sheet, said strip being trapezoidal in section, driving means engaging said strip for driving the sheet longitudinally while providing transverse guiding thereof, adhesion means on the outer surface of the sheet to promote adhesion thereof with a surface engaged thereby, said adhesion means including a plurality of spaced transverse metallic profiled cleats, and fastening means extending from said transverse cleats, through said sheet and into said strip to secure together an assembled unit.

2. Drive apparatus as claimed in claim 1 wherein said sheet is substantially thinner than said strip and is flexible longitudinally with respect to said strip.

3. Drive apparatus as claimed in claim 1, wherein only one said strip is provided, such strip being disposed centrally of said sheet.

4. Drive apparatus as claimed in claim 1, wherein said drive means comprises a pair of pulleys for each strip, one of which pulleys is driven, said pulleys each having a groove therein accommodating a corresponding strip.

5. Drive apparatus as claimed in claim 4, wherein each strip has a trapezoidal section and the grooves in the pulleys are of corresponding trapezoidal section.

6. Drive apparatus as claimed in claim 4 comprising projections and corresponding recesses on said strips and the surfaces of the pulleys at said grooves, said projections being engaged in said recesses.

References Cited

UNITED STATES PATENTS

| | | | |
|---|---|---|---|
| 2,494,065 | 1/1950 | Slemmons | 305—38 |
| 2,531,111 | 11/1950 | Daniels | 305—38 |
| 2,898,965 | 8/1959 | Eddy | 305—35X |
| 3,019,061 | 1/1962 | Schomers | 305—35X |

FOREIGN PATENTS 350,200   12/1960   Switzerland.

RICHARD J. JOHNSON, Primary Examiner